(12) United States Patent
Lehmann et al.

(10) Patent No.: US 11,811,204 B2
(45) Date of Patent: Nov. 7, 2023

(54) WALL INSTALLATION CONNECTION BOX UNIT WITH AN EXTENSION SLEEVE

(71) Applicant: Hansgrohe SE, Schiltach (DE)

(72) Inventors: Günther Lehmann, Oberwolfach (DE); Jürgen Schorer, Schiltach (DE); Thomas Doll, Oberkirch (DE)

(73) Assignee: Hansgrohe SE, Schiltach (DE)

( * ) Notice: Subject to any disclaimer, the term of this patent is extended or adjusted under 35 U.S.C. 154(b) by 153 days.

(21) Appl. No.: 17/209,899

(22) Filed: Mar. 23, 2021

(65) Prior Publication Data

US 2021/0305793 A1    Sep. 30, 2021

(30) Foreign Application Priority Data

Mar. 24, 2020    (DE) ...................... 10 2020 203 797.3

(51) Int. Cl.
*H02G 3/08*    (2006.01)
*E03B 7/09*    (2006.01)

(52) U.S. Cl.
CPC ............. *H02G 3/081* (2013.01); *E03B 7/095* (2013.01)

(58) Field of Classification Search
CPC ................................ H02G 3/081; E03B 7/095
(Continued)

(56) References Cited

U.S. PATENT DOCUMENTS 1,822,056 A    9/1931    Noble
2,297,862 A *  10/1942   Bachmann ............. H02G 3/123
                                                       220/3.6

(Continued)

FOREIGN PATENT DOCUMENTS

AT    507052       1/2010
AT    517356 A4    1/2017
(Continued)

OTHER PUBLICATIONS

Office Action in German Language issued by the German Patent Office, Munich, Germany, dated Feb. 18, 2021, for German Patent Application No. 10 2020 203 797.3, 7 pages.
(Continued)

*Primary Examiner* — J. Gregory Pickett
*Assistant Examiner* — Niki M Eloshway
(74) *Attorney, Agent, or Firm* — Bose McKinney & Evans LLP

(57) ABSTRACT

A wall installation connection box unit, including a box housing body having a rear-side base portion and a sleeve portion projecting forward from the base portion, which sleeve portion peripherally surrounds an installation component mounting space, which space is accessible via an open front end face of the sleeve portion, an extension sleeve which is configured for coaxial arrangement on the sleeve portion and axial pushing back relative to the sleeve portion, and a retaining structure which allows axial pushing back of the extension sleeve on the sleeve portion from a mounting position to an end use position on variable axial level and retains the extension sleeve in the end use position on the sleeve portion. Illustratively, the retaining structure includes a retaining ridge structure radially projecting from the sleeve portion, which is formed integrally with at least one adjacent axial partial region of the sleeve portion from a sealing resilient material, and a counter-retaining structure cooperating with the retaining ridge structure in a frictionally engaged and/or form-locking manner, provided on the extension sleeve and made from a material which has greater stiffness as compared to the sealing resilient material. In addition or as an alternative, the wall installation connection box unit includes a spacer element which is attachable to the box housing body in a securing position in a detachable
(Continued)

manner, where the spacer element secures the extension sleeve in the mounting position against axial pushing back.

12 Claims, 3 Drawing Sheets

(58) Field of Classification Search
USPC .................................. 220/3.3, 3.7, 3.94, 4.03
See application file for complete search history.

(56) References Cited

U.S. PATENT DOCUMENTS

| | | | |
|---|---|---|---|
| 4,181,329 A | 1/1980 | Helm | |
| 4,265,265 A | 5/1981 | Wallace | |
| 4,265,365 A | 5/1981 | Boteler | |
| 5,046,521 A | 9/1991 | Jensen | |
| 5,368,065 A | 11/1994 | Humpert | |
| 5,783,774 A * | 7/1998 | Bowman | H02G 3/185 |
| | | | 174/487 |
| 5,913,439 A * | 6/1999 | Von Arx | H02G 3/121 |
| | | | 220/4.03 |
| 5,934,032 A | 8/1999 | Oberdorfer | |
| 6,499,771 B1 | 12/2002 | Snyder, Sr. | |
| 6,547,285 B1 | 4/2003 | Schoenweger et al. | |
| 6,992,252 B1 | 1/2006 | Rao | |
| 7,462,775 B1 | 12/2008 | Gretz | |
| 7,523,837 B2 * | 4/2009 | Schoenweger | H02G 3/121 |
| | | | 220/3.7 |
| 8,158,884 B2 | 4/2012 | De la Borbolla | |
| 8,398,122 B2 | 3/2013 | Crompton | |
| 8,459,301 B2 | 6/2013 | Lorch | |
| 8,899,431 B1 * | 12/2014 | Shotey | H02G 3/086 |
| | | | 220/4.03 |
| 9,086,179 B1 | 7/2015 | Komolrochanaporn | |
| 10,280,598 B2 | 5/2019 | Tzeng | |
| 10,745,894 B2 | 8/2020 | Colombo | |
| 10,889,968 B2 | 1/2021 | Philipps et al. | |
| 11,451,029 B2 | 9/2022 | Tseng et al. | |
| 2004/0050423 A1 | 3/2004 | Schoenweger | |
| 2005/0194785 A1 | 9/2005 | Shemtov | |
| 2011/0101673 A1 | 5/2011 | Kern-Emmerich et al. | |
| 2011/0309611 A1 | 12/2011 | Smith | |
| 2012/0284994 A1 | 11/2012 | Crompton | |
| 2013/0334220 A1 * | 12/2013 | Sohler | B65D 21/086 |
| | | | 220/4.03 |
| 2015/0259891 A1 | 9/2015 | Ismert et al. | |
| 2016/0352087 A1 * | 12/2016 | Wurms | H02G 3/081 |
| 2017/0002551 A1 | 1/2017 | Zhou | |
| 2017/0152979 A1 | 6/2017 | Klein et al. | |
| 2017/0152980 A1 | 6/2017 | Klein et al. | |
| 2017/0256930 A1 * | 9/2017 | Wurms | H02G 3/185 |
| 2018/0003329 A1 | 1/2018 | Sochtig et al. | |
| 2018/0017197 A1 | 1/2018 | Meister et al. | |
| 2018/0073223 A1 | 3/2018 | Colombo | |
| 2018/0123332 A1 * | 5/2018 | Laukhuf | H02G 3/126 |
| 2018/0266606 A1 | 9/2018 | Meister et al. | |
| 2018/0274705 A1 | 9/2018 | Meister et al. | |
| 2019/0107234 A1 | 4/2019 | Corbett et al. | |
| 2019/0134524 A1 | 5/2019 | De Wilde | |
| 2019/0219170 A1 * | 7/2019 | Gandolfo | F16J 15/022 |
| 2019/0338498 A1 | 11/2019 | Luig et al. | |
| 2019/0338499 A1 | 11/2019 | Philipps et al. | |
| 2021/0301507 A1 | 9/2021 | Lehmann et al. | |
| 2021/0301508 A1 | 9/2021 | Grob et al. | |
| 2021/0305796 A1 | 9/2021 | Blattner et al. | |

FOREIGN PATENT DOCUMENTS

| | | | |
|---|---|---|---|
| CH | 681237 A5 | 2/1993 | |
| CN | 102057205 A | 5/2011 | |
| CN | 203589341 U | 5/2014 | |
| CN | 204732809 U | 10/2015 | |
| CN | 106195376 A | 12/2016 | |
| CN | 106461141 A | 2/2017 | |
| CN | 107620846 A | 1/2018 | |
| CN | 108290079 A | 7/2018 | |
| CN | 108626505 A | 10/2018 | |
| CN | 208461082 U | 2/2019 | |
| CN | 109630785 A | 4/2019 | |
| CN | 209388954 U | 9/2019 | |
| CN | 110557957 A | 12/2019 | |
| CN | 114498493 A * | 5/2022 | ............ H02G 3/123 |
| DE | 2637719 | 2/1978 | |
| DE | 3310138 A1 | 10/1984 | |
| DE | 3907588 A1 | 9/1990 | |
| DE | 4417485 C2 | 8/1997 | |
| DE | 19715651 | 10/1998 | |
| DE | 19856156 A1 | 6/2000 | |
| DE | 20105345 | 7/2001 | |
| DE | 10036996 | 1/2002 | |
| DE | 10122022 | 11/2002 | |
| DE | 10233858 A1 | 1/2004 | |
| DE | 102004060744 | 6/2006 | |
| DE | 20321431 | 4/2007 | |
| DE | 102007002235 | 7/2008 | |
| DE | 102007044284 | 3/2009 | |
| DE | 102008064253 | 2/2010 | |
| DE | 202009014967 | 2/2010 | |
| DE | 102009012838 | 8/2010 | |
| DE | 102009049711 | 4/2011 | |
| DE | 102012203393 A1 | 9/2013 | |
| DE | 202014106179 U1 * | 4/2015 | ............ E03B 7/095 |
| DE | 102015112420 | 2/2017 | |
| DE | 102014208291 | 2/2018 | |
| DE | 102017100707 | 7/2018 | |
| DE | 102017100710 | 7/2018 | |
| DE | 102017127151 | 5/2019 | |
| EP | 424690 | 5/1991 | |
| EP | 0546288 A1 | 6/1993 | |
| EP | 1006244 | 6/2000 | |
| EP | 1256662 | 11/2002 | |
| EP | 1355399 A1 * | 10/2003 | ............ H02G 3/081 |
| EP | 1382757 A1 | 1/2004 | |
| EP | 1382757 B1 | 8/2007 | |
| EP | 2101002 | 9/2009 | |
| EP | 2226432 A2 | 9/2010 | |
| EP | 2636803 A2 | 9/2013 | |
| EP | 2468966 | 10/2013 | |
| EP | 2822121 A2 | 1/2015 | |
| EP | 2636803 B1 | 10/2017 | |
| EP | 3486380 | 5/2019 | |
| EP | 3570396 A1 | 11/2019 | |
| GB | 622374 A | 5/1949 | |
| GB | 2337287 A * | 11/1999 | ......... E02D 29/1463 |
| JP | 2002374613 A | 12/2002 | |
| NO | 336337 B1 | 8/2015 | |
| PL | 183459 B1 | 5/1998 | |
| RU | 2518469 C2 | 6/2014 | |
| WO | WO-03081054 A1 * | 10/2003 | ........... B60Q 1/0441 |
| WO | 2010069606 | 6/2010 | |
| WO | WO2015166084 | 11/2015 | |
| WO | 2016147042 | 9/2016 | |
| WO | 2017091839 A1 | 6/2017 | |

OTHER PUBLICATIONS

Office Action issued by the National Intellectual Property Administration, P.R. China, dated Aug. 8, 2022 for Chinese Patent Application No. 202110312348.4 (Chinese and English Language), 14 pages.

Decision on Granting issued by the Patent Office in the Russian Federation on Nov. 24, 2021 (including English language translation), 19 pages.

Office Action issued by the National Intellectual Property Administration, P.R. China, dated Jul. 25, 2022 for Chinese Patent Application No. 202110312452.3 (Chinese and English Language), 6 pages and 5 pages, respectively.

Office Action issued by the National Intellectual Property Administration, P.R. China, dated Jul. 25, 2022 for Chinese Patent Application No. 202110312440.0 (Chinese Language), 8 pages.

(56) References Cited

OTHER PUBLICATIONS

European Search Report (in German language) issued by the European Patent Office (Munich), dated Aug. 23, 2021, for European Patent Application No. 21164305.1, 9 pages.
Translation of Chinese Office Action from the National Intellectual Property Administration, 4 pages.
Translation of Chinese Search Report from the National Intellectual Property Administration, 3 pages.

* cited by examiner

WALL INSTALLATION CONNECTION BOX UNIT WITH AN EXTENSION SLEEVE

CROSS-REFERENCE TO RELATED APPLICATION

This application claims priority to German Patent Application No. DE 10 2020 203 797.3, filed on Mar. 24, 2020, the disclosure of which is expressly incorporated herein by reference.

BACKGROUND AND SUMMARY OF THE DISCLOSURE

The invention relates to a wall installation connection box unit which includes a box housing body having a rear-side base portion and a sleeve portion projecting forward from the base portion, which sleeve portion peripherally surrounds an installation component mounting space, which space is accessible via an open front end face of the sleeve portion, an extension sleeve which is configured for coaxial arrangement on the sleeve portion and axial pushing back relative to the sleeve portion, and a retaining structure which allows axial pushing back of the extension sleeve on the sleeve portion from a mounting position to an end use position on a variable axial level and retains the extension sleeve in the end use position on the sleeve portion.

Connection box units of this type are used, for example, in sanitary installation technology for connecting installation components in the form of sanitary components, such as water outlet fittings for washbasins, bathtubs, shower heads or kitchen sinks or sanitary thermostat, mixer and/or shut-off valve units mounted upstream, to water conduit connections pre-installed in the building, and, in electrical installation technology, for connecting electrical installation components, such as sockets, junction boxes, sensors, actuators, light switches, etc., to electrical conduit connections pre-installed in the building. Typical in this context are especially flush-mounted designs in which the wall installation connection box unit is installed in the relevant building wall in such a manner that it ends on the front side in as flush a manner as possible with the finished building wall surface, for example a plastered wall surface or a tiled wall surface. It is understood that the building wall in this case can be either a vertical building wall in the narrower sense or a bottom wall or bottom surface or a top wall or top surface of a building or of a room, for example of a shower room, a bathroom, a toilet room, a kitchen, etc., in the sanitary case.

A connector body which is arranged in the rearward base portion of the box housing body conventionally acts as a connecting link for connecting the installation component to the conduit connections in the building, wherein the base portion is correspondingly designed for the arrangement or retaining of the connector body. The connector body includes an installation component connection contour facing the installation component mounting space, and a conduit connection interface structure accessible on an outer side of the box housing body.

The conduit connection interface structure typically includes one or more connection interfaces: in the sanitary case, a fluid conduit connection interface structure in particular in the form of corresponding pipe conduit connection ports for coupling to a corresponding pipe conduit connection port in the building, for example for cold water, hot water or mixed water mixed from cold water and hot water; in the electrical case, an electrical conduit connection interface structure, in particular in the form of cable conduit connections.

The installation component connection contour of the connector body, in the sanitary case, a sanitary component connection contour and, in the electrical case, an electrical component connection contour, is designed to interact with a corresponding connection contour of an installation component to be coupled, such as a mixing unit and/or shut-off valve unit or a water outlet fitting in the sanitary case, or an electrical installation component in the electrical case. In the sanitary case, the connector body includes a fluid channel structure for fluidly connecting the fluid conduit connection interface structure on the outer side of the box to the sanitary component connection contour on the inner side of the box, and, in the electrical case, includes an electrically conductive connection of the electrical conduit connection interface structure on the outer side of the box to the electrical component connection contour on the inner side of the box.

The connection box unit is inserted with its rear side or a rear-side bottom in front into a building wall opening or placed on a building wall, for example on a wall produced in a dry construction, wherein the required conduit connections between the connections in the building, on the one hand, and the connection interface structure of the connector body, on the other hand, are made. After completion of the wall, the installation component can then be introduced into the mounting space of the box housing body via the open front end face of the box housing body and coupled to the matching connection contour of the connector body.

A known problem with the wall mounting of such and similar connection box units consists in that the position of the connection box unit with respect to the finished building wall surface, in particular in respect of the installation depth of said unit in the case of a flush-mounted installation, is not precisely predetermined for as long as the building wall is not yet completed, in particular is not yet plastered, tiled or clad in another way.

This problem is remedied in the case of connection box units of the type under consideration here by means of the extension sleeve which is arranged in a telescopically movable manner on the sleeve portion of the box housing body using the retaining structure, i.e. is arranged coaxially on the sleeve portion and guided on the latter and so as to be adjustable axially in level relative thereto, and can be retained on the sleeve portion in a variably predeterminable, desired axial position. In particular, the extension sleeve can be pushed back rearwards from an initial mounting position into an end use position by a variable axial extent, i.e. in the direction of the base portion of the box housing body or in the direction of a greater axial overlap with the sleeve portion. The extension sleeve can optionally not only be moved back axially unidirectionally, but additionally also bidirectionally forwards again, i.e. can be moved in a direction away from the base portion of the box housing body or forwards in the direction of a smaller axial overlap with the sleeve portion. Depending on requirements and application, the extension sleeve here is guided on the inner periphery or outer periphery of the sleeve portion. In the former case, it has an outer diameter which is suitably smaller than an inner diameter of the sleeve portion and is peripherally surrounded by the sleeve portion; in the other case, it has an inner diameter which is suitably greater than an outer diameter of the sleeve portion and peripherally surrounds the sleeve portion.

In order to mount these connection box units on the building wall, the extension sleeve is initially retained in the mounting position, which is a position projecting sufficiently far forwards beyond the sleeve portion, which ensures that the connection box unit once mounted on the wall extends with its extension sleeve forwards at least as far as the planned finished building wall surface, preferably projects forwards beyond the latter and at any rate does not remain back behind the latter. As soon as the building wall is subsequently then finished, the extension sleeve, when or if it projects in its mounting position over the surface of the finished building wall, can be pushed back axially into a position ultimately desired for use of the connection box unit after completion of the building wall surface, preferably so as to end flush or approximately flush on the front side with the finished wall surface. A complicated trimming of a sleeve part protruding over the finished wall surface, as is often required in the case of conventional connection box units without such an extension sleeve, is thereby rendered superfluous. This ultimately desired position of the extension sleeve is thus the respective end use position thereof, the axial level of which relative to the sleeve portion of the box housing body can vary depending on the resulting height level of the finished wall surface, as measured perpendicularly to the wall surface. The retaining structure allows this axial pushing back of the extension sleeve on the sleeve portion from the mounting position to the end use position on a variable axial level and ensures that the extension sleeve is retained sufficiently securely on the sleeve portion in the end use position.

Laid-open publication DE 10 2012 203 393 A1 discloses a wall installation connection box unit of the type mentioned at the outset, in which the extension sleeve, which is referred to there as a cuff, is guided with its lateral outer side on the lateral inner side of the sleeve portion of the box housing body so as to be axially continuously adjustable in level, and, for this purpose, the retaining structure includes a sealing ring which is accommodated in a radially outwardly projecting manner in a sealing ring mount on the outer side of the cuff such that said sealing ring lies with a certain surface pressure against the inner side of the sleeve portion of the box housing body in order to provide a continuously adjustable and sealing, frictionally engaged connection of cuff and sleeve portion of the box housing body.

Laid-open publication WO 2017/091839 A1 discloses a wall installation connection box unit of the type mentioned at the outset, in which the extension sleeve which can be adjusted in level axially is designed as a mounting sleeve which, at its free front end face, has a fastening means for fastening an add-on component, such as, for example, a sanitary mixer fitting, and in which the retaining structure includes cooperating locking bar structures, which are continuous circumferentially or are formed only in segment regions, on the mounting sleeve, on the one hand, and on the sleeve portion of the box housing body, on the other hand, as a result of which the mounting sleeve can be locked on the sleeve portion of the box housing body in a correspondingly staggered manner at a plurality of different axial height steps. The locking can be secured by a securing sleeve to be additionally introduced.

It is an object of the invention to provide a wall installation connection box unit of the type mentioned at the outset which in particular provides functional advantages and/or advantages in respect of the outlay on manufacturing and/or installation in comparison to the above-mentioned prior art.

The invention achieves this and other objects by providing a wall installation connection box unit which includes a box housing body having a rear-side base portion and a sleeve portion projecting forward from the base portion, which sleeve portion peripherally surrounds an installation component mounting space, which space is accessible via an open front end face of the sleeve portion, an extension sleeve which is configured for coaxial arrangement on the sleeve portion and axial pushing back relative to the sleeve portion, and a retaining structure which allows axial pushing back of the extension sleeve on the sleeve portion from a mounting position to an end use position on a variable axial level and retains the extension sleeve in the end use position on the sleeve portion.

According to one aspect of the invention, the retaining structure includes a retaining ridge structure radially projecting from the sleeve portion, which retaining ridge structure is formed integrally with at least one adjacent axial partial region of the sleeve portion from a sealing resilient material, and a counter-retaining structure cooperating with the retaining ridge structure in a frictionally engaged and/or form-locking manner, the counter-retaining structure being provided on the extension sleeve and made of a material which has greater stiffness as compared to the sealing resilient material.

Since the retaining ridge structure is formed integrally with the sleeve portion as a whole or at any rate with an axial partial region of the sleeve portion adjacent to the retaining ridge structure, additional components for providing the retaining ridge structure and a corresponding outlay on manufacturing can be saved.

The formation of the retaining ridge structure from a sealing resilient material enables it, in frictionally engaged and/or form-locking cooperation with the counter-retaining structure, which has greater stiffness by comparison, on the extension sleeve to ensure a desired fluid-tight connection of extension sleeve and sleeve portion of the box housing body without additional, separate sealing measures necessarily being required for this purpose. For example, a rubber material or a synthetic foamed material can be used for the retaining ridge structure.

Since the counter-retaining structure on the extension sleeve is formed from a material which has a greater stiffness as compared to the sealing resilient material of the retaining ridge structure, the material connection between sealing resilient, soft material, on the one hand, and stiffer material, on the other hand, enables the provision of a connection between extension sleeve and sleeve portion that both provides reliable sealing and reliable securing in a frictionally engaged and/or form-locking manner and also permits the telescopically axial adjustability of the level of the extension sleeve on the sleeve portion of the box housing body. The stiffer material of the counter-holding structure can be, for example, a synthetic material that has greater stiffness as compared to the retaining ridge structure, or a metal material. Depending on requirements and application, the extension sleeve can be formed completely or only in the region of the counter-holding structure from the material of the counter-holding structure. In particular, this embodiment according to the invention of the retaining structure permits, when required, a continuous adjustability of the level of the extension sleeve in relation to the sleeve portion of the box housing body.

According to another aspect of the invention that can be realized in addition or alternatively to the before-mentioned aspect, the wall installation connection box unit includes a detachable spacer element which is attachable to the box housing body in a securing position in a detachable manner, where the spacer element secures the extension sleeve in the mounting position against axial pushing back.

With this spacer element, the connection box unit can be secured in particular against an unintentional axial pushing back of the extension sleeve relative to the sleeve portion of the box housing body before and/or during the mounting of the connection box unit. This can advantageously be used to retain the extension sleeve in a preassembled state on the sleeve portion of the box housing body in a manner secured against pushing back in the mounting position already when the connection box unit is in a delivery state after being manufactured or at any rate before the connection box unit is attached in or to a building wall, wherein said mounting position can be, for example, a position of the extension sleeve projecting forward maximally beyond the sleeve portion. During installation of the connection box unit on the wall, then, at the latest after the wall surface of the building wall is finished and the extension sleeve is intended to be pushed back from its mounting position into its end use position, in which it ends with its front end face or end edge for example substantially flush with the finished wall surface, the spacer element is detached, i.e. removed, after which the extension sleeve can be pushed back axially by the desired extent. The detaching or removing of the spacer element from the box housing body can be undertaken without destruction or with destruction of the spacer element, depending on the design. In the former case, it can be reused if required; in the latter case, it is designed as a destructively detachable disposable component.

Advantageous developments of the invention are specified in the dependent claims, the wording of which is hereby made part of the description by reference. This in particular also includes all of the embodiments of the invention that arise from the combinations of features which are defined by the dependency references in the dependent claims.

In a development of the invention, the retaining ridge structure includes a continuous circumferential retaining ridge on its peripheral side, which retaining ridge protrudes radially inwards on an inner side of the sleeve portion, or radially outwards on an outer side of the sleeve portion. This is a structurally and functionally advantageous realization of the retaining ridge structure. The retaining ridge extends continuously over the entire periphery of the sleeve portion and can thereby ensure both secure retaining of the extension sleeve on the sleeve portion of the box housing body and reliable sealing of the connection between sleeve portion and extension sleeve.

As counter-retaining structure, the extension sleeve preferably has, suitably for this purpose, a structured or profiled surface region promoting the sealing retention on the sleeve portion in cooperation with the retaining ridge; alternatively, the outer or inner lateral surface of the sleeve as such already suffices as the counter-retaining structure, which cooperates with the retaining ridge, on the extension sleeve. The retaining ridge can be placed in a sealing manner against the stiffer material of the counter-retaining structure in the corresponding profiled or non-profiled surface region of the extension sleeve. In corresponding embodiments, the retaining ridge structure includes only a single such retaining ridge or any desired plurality of such retaining ridges that are arranged at an axial distance from one another.

In a development of the invention, the retaining ridge structure is formed from a synthetic foamed material, preferably a thermoplastic particle foamed material. This is an advantageous realization of the retaining ridge structure that can be combined in particular with the measure that the sleeve portion of the box housing body as a whole, in corresponding embodiments the entire box housing body, is formed from the synthetic foamed material or the thermoplastic particle foamed material. The synthetic foamed material, in a simple manner in terms of manufacturing, enables the provision of the functional properties required for the retaining ridge structure in respect of sufficiently axially displaceable guiding and secure retaining of the extension sleeve on the sleeve portion and in respect of the fluid-tight connection between extension sleeve and sleeve portion. Alternatively, the retaining ridge structure can also be formed, for example, from a sealing rubber material or from another material known per se to a person skilled in the art for sealing similar connections.

In a development of the invention, the counter-retaining structure includes a retaining tooth structure having a plurality of axially successive retaining teeth which, extending peripherally, protrude radially outwards on an outer side of the extension sleeve, or radially inwards on an inner side of the extension sleeve. This is an advantageous realization of the counter-retaining structure in respect of the retaining and sealing function. In this case, the counter-retaining structure can engage with its retaining teeth in the sealing resilient material of the retaining ridge structure and can thereby very simply and reliably ensure a mechanically secure retaining and fluidly secure sealing of the extension sleeve in relation to the sleeve portion of the box housing body. Since a plurality of retaining teeth are arranged axially successively and the engaging of the retaining teeth in the retaining ridge structure is possible virtually continuously in each axial level within the axial region of action of retaining tooth structure and retaining ridge structure, the extension sleeve can be very simply adjusted axially on the sleeve portion variably and preferably continuously, in particular can be pushed back, and can thereby be brought into its respectively desired optimum end use position on the sleeve portion of the box housing body and retained in a reliably sealed manner.

In a refinement of the invention, the retaining tooth structure with the retaining teeth thereof forms a saw tooth profile including flatter tooth trailing edges pointing in the push-back direction of the extension sleeve, and opposed thereto steeper tooth front edges. This special configuration of the retaining teeth makes it possible to make it more difficult to move the extension sleeve forwards out of the end use position in comparison to moving same back from the mounting position into the end use position, thus achieving the desirable effect that a movement of the extension sleeve forwards out of its end use position is prevented or at any rate is made more difficult in comparison to the effort needed to push back the extension sleeve from its mounting position into its end use position.

In a refinement of the invention, the retaining tooth structure is disposed with an axial distance to a rearward end face of the extension sleeve, and a portion of the extension sleeve extending from the rearward end face axially up to at most to the retaining tooth structure provides a preassembly plug area which is configured for preassembled plugged retaining of the extension sleeve in its mounting position on the sleeve portion of the box housing body. This permits simple preassembly of the extension sleeve on the sleeve portion of the box housing body by the extension sleeve with its preassembly plug area being plugged into the sleeve portion or plugged onto the latter. For this purpose, the retaining tooth structure does not yet need to be in operative connection with the retaining ridge structure on the extension sleeve, and therefore the connection between retaining tooth structure and retaining ridge structure is not exposed to any loads as long as the extension sleeve has not yet been pushed back into its end use position. The preassembly plug area can be formed, for example, simply by a non-intrinsically profiled end face region of the inner or outer lateral surface of the extension sleeve; alternatively, it can additionally have a profiling assisting the temporary retaining of the extension sleeve on the sleeve portion of the box housing body in the mounting position.

In a development of the invention, the extension sleeve has a radially outwards protruding blind ring flange at a front end face. The blind ring flange can be used for diverse applications, for example for attaching a covering rosette or as an annular stop for placing against the finished surface of the building wall in the end use position of the extension sleeve. In alternative embodiments, the extension sleeve ends at the front end face without a radially outwardly protruding annular flange.

In a development of the invention, a mounting cover is attachable on a front end face of the extension sleeve in a detachable manner, for example by simply plugging it on and pulling it off. The mounting cover can be used, for example, to protect the interior of the extension sleeve and of the sleeve portion of the box housing body from soiling before and/or during the mounting of the connection box unit on the wall. Furthermore, it can be used when required for the holding or placing of a spirit level or a level or a circular level. In this case, it preferably has a corresponding spirit level contact structure or level holder on an outer side. The mounting cover optionally has a preferably central gripping pin on the outer side as a handling aid for the user. After mounting of the connection box unit on the wall has been completed, the mounting cover is removed.

In a development of the invention, the spacer element includes a spacer sleeve which in the securing position is disposed coaxially on the sleeve portion in an axial region behind the extension sleeve. In corresponding realizations, the spacer sleeve can be inserted removably into the sleeve portion and surrounded peripherally by the latter when the extension sleeve is guided on the inner periphery of the sleeve portion, or alternatively can be disposed detachably on the sleeve portion in a manner surrounding the latter peripherally when the extension sleeve is guided on the outer periphery of the sleeve portion.

The spacer sleeve is preferably realized in such a manner that it can be produced with little outlay and permits simple attaching and preferably destruction-free detaching or removing from the box housing body. Alternatively, the spacer sleeve can be designed as a disposable sleeve which can be removed by being destroyed. In both cases, the spacer sleeve can be formed from any material which permits the above-mentioned properties and requires little outlay on realization, for example from a suitably elastically or inelastically deformable material, such as from cardboard or a flexurally elastic plastic. Depending on requirements and application, the spacer sleeve can be formed by a peripherally continuous, closed sleeve part or alternatively by a peripherally open sleeve part with a continuous axial slot, i.e. by an open sleeve part extending only over a peripheral angle of less than 360°. It is in each case essential only that the spacer sleeve withstands possible axial pressure actions of the extension sleeve before and/or during the mounting of the connection box unit on the wall in order at the same time to hold the extension sleeve in its mounting position even if an axial compressive force acts on the front end face of the extension sleeve.

In alternative embodiments, the spacer element includes, for example, a blocking pin which is held protruding radially on the sleeve portion of the box housing body, preferably such that it can be pulled off, and which blocks the axial movement path of the extension sleeve, or a releasable clip connection with which the extension sleeve in its mounting position is held clipped on the sleeve portion.

In a refinement of the invention, the spacer sleeve is a constrictable annular sleeve which is open on its peripheral side and includes a user-operable tightening actuation structure. This enables the user to very simply fit the spacer sleeve without destruction into the sleeve portion of the box housing body and/or to remove the spacer sleeve from the sleeve portion by the user gripping the open annular sleeve at the tightening actuation structure, which acts as a handling aid, for example with the fingers of one hand, and radially compressing, i.e. constricting same such that its radial extent is reduced as compared with its use position in the sleeve portion.

In a refinement of the invention, the spacer sleeve includes a radially inwards overhanging flange structure on a front end face. This flange structure can be used, for example, as a stop surface, against which the extension sleeve comes into contact when the latter is plugged together with the sleeve portion of the box housing body, in order to be brought into its mounting position. The flange structure then protects against further axial movement back of the extension sleeve further into the sleeve portion of the box housing body. When required, the flange structure can also simultaneously act as the abovementioned tightening actuation structure for the user.

Additional features and advantages of the present invention will become apparent to those skilled in the art upon consideration of the following detailed description of the illustrative embodiments best exemplifying the best mode of carrying out the invention as presently perceived.

BRIEF DESCRIPTION OF THE DRAWINGS

Advantageous exemplary embodiments of the invention are illustrated in the drawings. These and further illustrative embodiments of the invention will be described in more detail below. In the drawings.

DETAILED DESCRIPTION OF THE DRAWINGS

Figure 1:
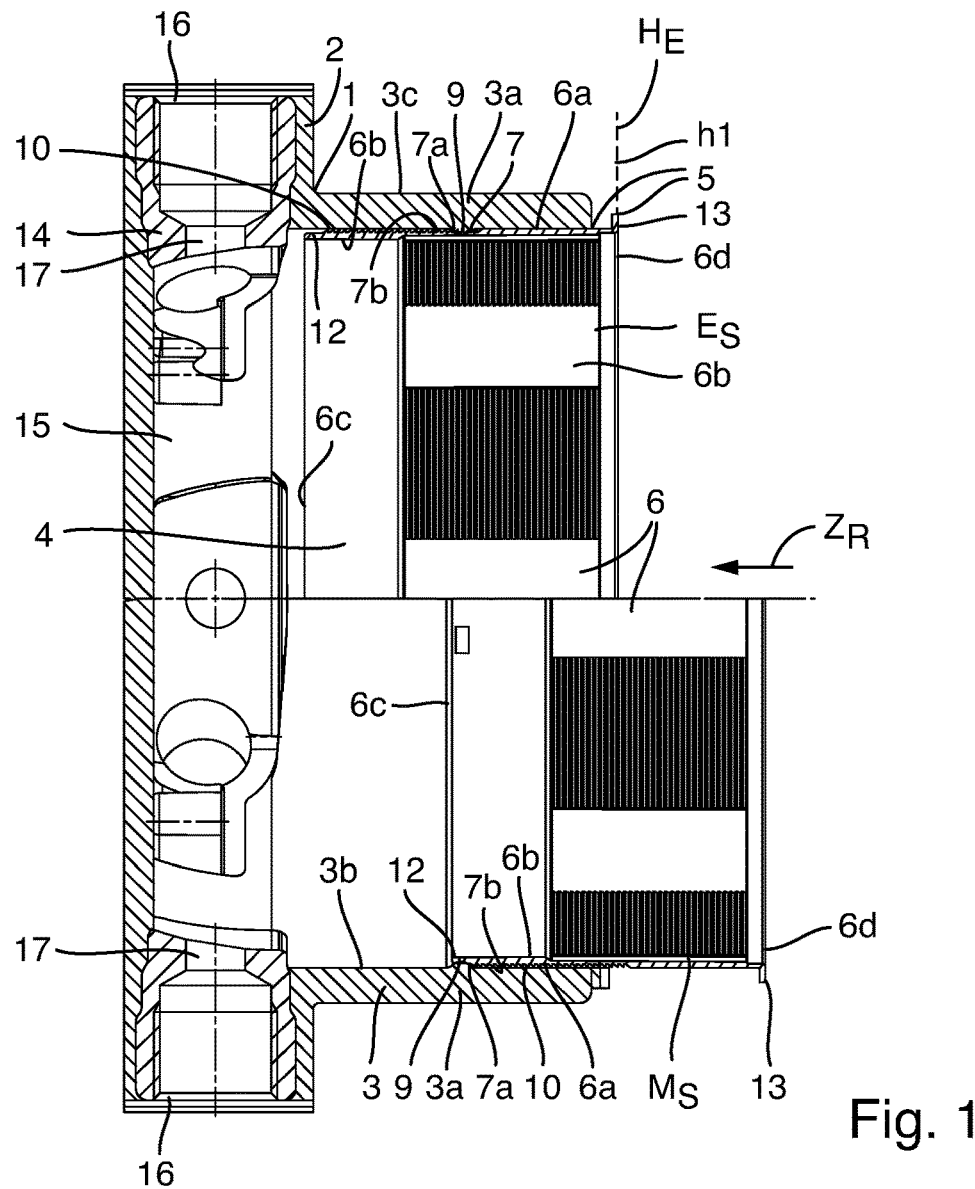
FIG. 1 shows a longitudinal sectional view of a wall installation connection box unit, one half in a mounting position and one half in a pushed-back end use position of an extension sleeve.

The embodiments of the invention described herein are not intended to be exhaustive or to limit the invention to precise forms disclosed. Rather, the embodiments selected for description have been chosen to enable one skilled in the art to practice the invention.

As illustrated by way of example in the embodiments which are shown, the wall installation connection box unit according to the invention includes a box housing body 1 having a rear-side base portion 2 and a sleeve portion 3 projecting forward from the base portion, an extension sleeve 6 and a retaining structure 7. The sleeve portion 3 of the box housing body 1 peripherally surrounds an installation component mounting space 4, which space is accessible via an open front end face 5 of the sleeve portion 3, as can be seen, for example, from FIGS. 1 to 3. The extension sleeve 6 is configured for coaxial arrangement on the sleeve portion 3 and axial pushing back relative to the sleeve portion 3. The retaining structure 7 allows axial pushing back of the extension sleeve 6 on the sleeve portion 3 from a mounting position MS visible in FIGS. 1, 3 and 8 to an end use position ES which can be seen in FIGS. 1 and 8 and retains the extension sleeve 6 in the end use position ES on the sleeve portion 3. Here, the mounting position MS is preferably a position of the extension sleeve 6 on the sleeve portion 3, in which the extension sleeve 6 on the one hand projects sufficiently far over the sleeve portion 3 of the box housing body 1 in order, even during and after completion of the relevant building wall surface, to still protrude over the latter and at any rate not to remain back behind the final surface height level thereof, and on the other hand is retained sufficiently securely in preassembled form on the sleeve portion 3 by already overlapping to a certain axial extent with the sleeve portion 3.

Figure 8:
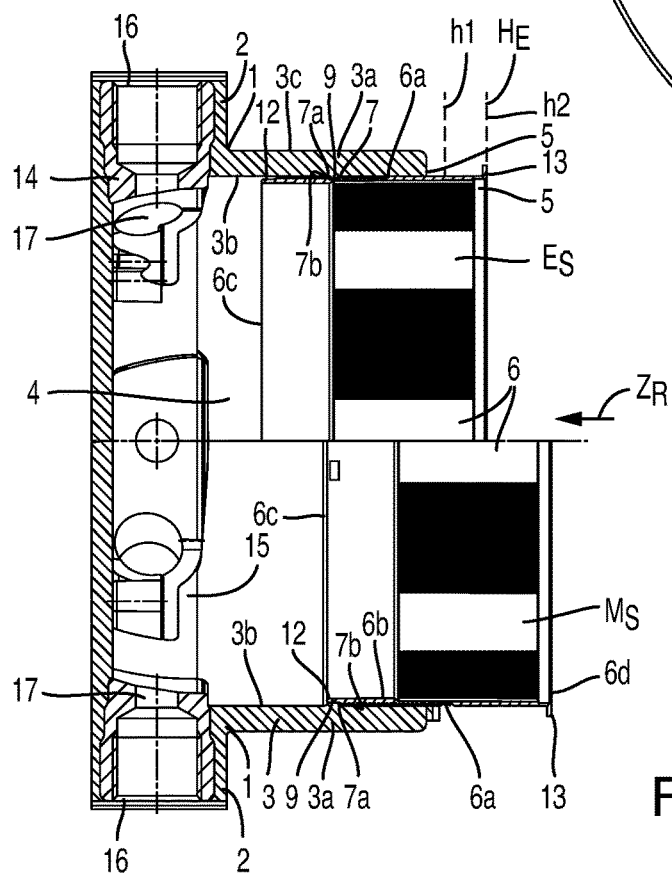
FIG. 8 shows a longitudinal sectional view of the connection box unit according to FIG. 1 with the extension sleeve in an end use position pushed back less far than in FIG. 1.

Here, the end use position ES is located on a variable axial level HE, i.e. the extension sleeve 6, when required, can be brought in said desired axial level HE variably relative to the sleeve portion 3 of the box housing body 1 to its end use position ES and retained there by the retaining structure 7 in a manner protected against unintentional axial movement away. By way of example, FIGS. 1 and 8 show two different end use positions ES, wherein the extension sleeve 6 in the case of FIG. 8 is located in an end use position ES lying further forward than in the case of FIG. 1, i.e. a front face side 6*d* of the extension sleeve 6 lies with respect to the sleeve portion 2 of the box housing body 1 in the case of FIG. 8 on an axial level h2 lying further forward than an axial level h1, which is additionally indicated in FIG. 8 for comparison purposes and on which said front face side 6*d* lies in the case of FIG. 1. The end use position ES of the extension sleeve 6 that is thus not pushed back so far in the direction of the building wall depth according to FIG. 8 is suitable, for example, for cases in which the finishing of the building wall results in a greater additional wall thickness or in which the conduit connections in the building lie deeper in the wall, i.e. offset further rearward, with respect to the surface of the finished wall surface than in the case of FIG. 1. The directional details front and rear mean here, unless explicitly stated otherwise, the directions perpendicular with respect to the wall surface outwards away from the wall or inwards into the wall.

In corresponding embodiments, the retaining structure 7, as in the exemplary embodiments shown, includes a retaining ridge structure 7*a* radially projecting from the sleeve portion 3, which retaining ridge structure is formed integrally with at least one adjacent axial partial region 3*a* of the sleeve portion 3 from a sealing resilient material, and a counter-retaining structure 7*b* cooperating with the retaining ridge structure 7*a* and being provided on the extension sleeve 6 and made of a material which has greater stiffness as compared to the sealing resilient material. This axial partial region 3*a* of the sleeve portion 3 can be any partial region of the sleeve portion 3 of any axial extent which also includes the retaining ridge structure 7*a*. Alternatively, the sleeve portion 3 as a whole can be formed from the sealing resilient material; in corresponding realizations, the box housing body 1 as a whole is formed integrally from this material. By the cooperation of the sealing resilient material of the retaining ridge structure 7*a* with the stiffer material of the counter-retaining structure 7*b*, the retaining structure 7 advantageously makes it possible, with relatively little outlay on realization, to sufficiently securely retain the extension sleeve 6 in its respectively desired end use position ES on the sleeve portion 3 of the box housing body 1 and to sufficiently sealingly connect the extension sleeve 6 to the sleeve portion 3 of the box housing body 1 by frictional engagement and/or a form lock.

Figure 3:
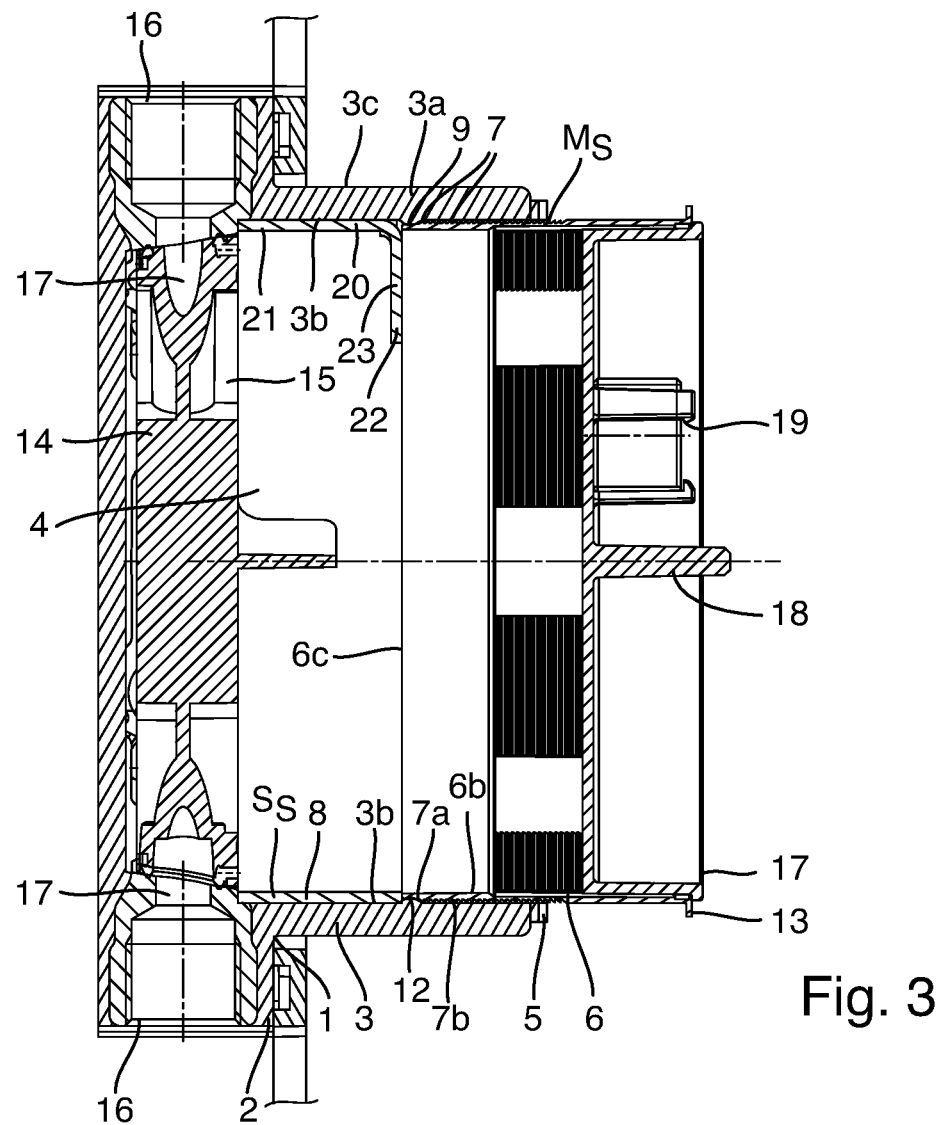
FIG. 3 shows a longitudinal sectional view of the connection box unit of FIG. 2 in the joined-together state of the individual parts.
Figure 4:
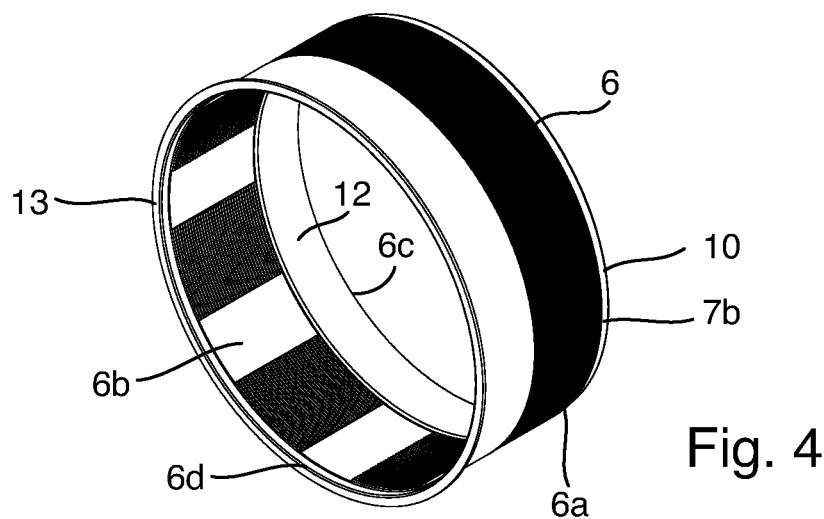
FIG. 4 shows a perspective view of the extension sleeve for the connection box unit of FIGS. 1 to 3.
Figure 5:
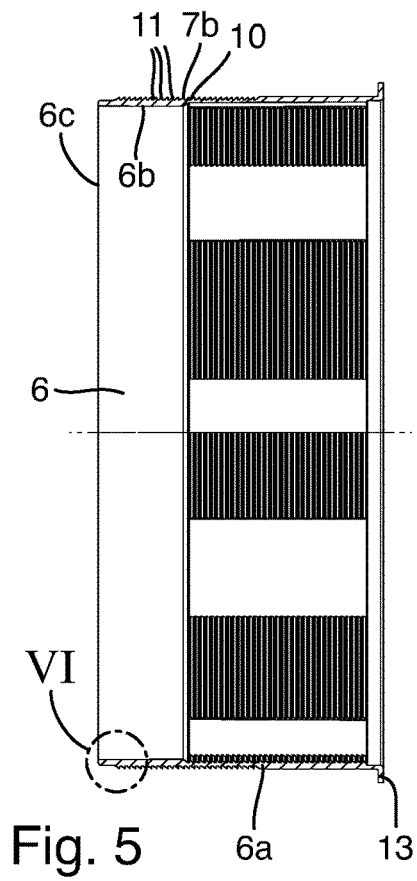
FIG. 5 shows a longitudinal sectional view of the extension sleeve of FIG. 4.

In corresponding embodiments, the wall installation connection box unit, as in the exemplary embodiments shown, includes a spacer element 8 which is attachable to the box housing body 1 in a securing position SS in a detachable manner, where the spacer element secures the extension sleeve 6 in the mounting position MS against axial pushing back, i.e. axial displacement in a push-back direction ZR, as can be seen from FIG. 3. This can be used in particular to protect the extension sleeve 6 against undesirable, premature pushing back out of its mounting position MS before and during the mounting of the connection box unit on the wall. As soon as the wall surface of the relevant building wall, in or on which the connection box unit is mounted, is finished, this securing can be removed by the spacer element 8 being detached from the box housing body 1, i.e. being removed therefrom.

In the exemplary embodiment shown, both abovementioned aspects of the invention in respect of forming the retaining structure 7 as a retaining ridge structure 7*a* and in respect of the temporarily used spacer element 8 are implemented. In alternative embodiments, only one of said two aspects of the invention is implemented.

The wall installation connection box unit shown can be configured in particular as a sanitary wall installation connection box unit for connecting sanitary components to water conduit connections in the building, as explained at the beginning, wherein the sleeve portion 3 of the box housing body 1 peripherally surrounds an installation component mounting space 4 which is then configured as a sanitary component mounting space and is accessible via an open front end face 5 of the sleeve portion 3 or of the extension sleeve 6, via which the installation component, such as a sanitary component, can be introduced into the box housing body 1, as can be seen, for example, in FIGS. 1 and 8. In alternative embodiments, not shown, the wall installation connection box unit is configured as an electrical wall installation connection box unit for connecting electrical components to electrical conduit connections in the building, as likewise explained at the beginning, wherein the installation component mounting space 4 then forms an electrical component mounting space into which the relevant electrical component can be introduced into the box housing body 1 via the open front end face 5 of the sleeve portion 3.

A connector body 14 which is arranged or held in the base portion 2 acts as a fluid- or conduit-connecting link, said connector body having an installation component connection contour 15 facing the installation component mounting space 4, i.e., in the sanitary case, a sanitary component connection contour and, in the electrical case, an electrical component connection contour, a conduit connection interface structure 16 accessible on an outer side of the box housing body 1, i.e., in the sanitary case, a fluid conduit connection interface structure and, in the electrical case, an electrical conduit connection interface structure, and, in the sanitary case, a fluid channel structure 17 for fluidly connecting the fluid conduit connection interface structure 16 to the sanitary component connection contour 15, and, in the electrical case, an electrically conductive connection of the electrical conduit connection interface structure on the outer side of the box to the electrical component connection contour on the inner side of the box, as can be seen in particular from FIGS. 1 to 3 and 8. Connector bodies with such functional components for use in sanitary and electrical installation technology are known per se to a person skilled in the art and thus do not need to be discussed in more detail here.

In advantageous embodiments, the retaining ridge structure 7a, as in the exemplary embodiments shown, includes a continuous circumferential retaining ridge 9 on its peripheral side, which retaining ridge, as shown, protrudes radially inwards on an inner side 3b of the sleeve portion 3, or alternatively radially outwards on an outer side 3c of the sleeve portion 3. In the example shown, the retaining ridge structure 7a includes only a single retaining ridge 9, and, in alternative embodiments, a plurality of continuous circumferential retaining ridges at an axial distance from one another on its peripheral side.

In advantageous embodiments, the retaining ridge structure 7a is formed from a synthetic foamed material, which can be in particular a thermoplastic particle foamed material, such as polypropylene particle foam. Alternatively, the retaining ridge structure 7a is formed from a different sealing resilient material, for example a sealing rubber material. In corresponding realizations, not only the retaining ridge structure 7a, but also the sleeve portion 3 or the box housing body 1 is formed from said synthetic foamed material. In the exemplary embodiment shown, the box housing body 1 as a whole is thus formed integrally, for example from a synthetic foamed material, or, alternatively, from a different sealing resilient material, wherein the connector body 14 is embedded in the synthetic foamed material of the base portion 2 of the box housing body 1.

In advantageous embodiments, the counter-retaining structure 7b, as in the example shown, includes a retaining tooth structure 10 having a plurality of axially successive retaining teeth 11 which, extending peripherally, protrude radially outwards on an outer side 6a of the extension sleeve 6, as shown, or alternatively radially inwards on an inner side 6b of the extension sleeve 6. The retaining teeth 11 which are composed of the stiffer material of the counter-retaining structure 7b can engage in the sealing resilient material of the retaining ridge structure 7a or can grip into the latter, which results in very secure and well sealed retaining of the extension sleeve 6 on the sleeve portion 2 of the box housing body 1 in the end use position ES both because of said form lock and because of the frictional engagement which is provided by the retaining ridge structure 7a pressing against the counter-retaining structure 7b of the stiffer material. In addition, this configuration of the counter-retaining structure 7b permits a virtually continuously variable, stepless selection of the axial level of the end use position ES for the extension sleeve 6 on the sleeve portion 2.

In alternative embodiments, the counter-retaining structure 7b can be formed by a differently structured or profiled surface region of the extension sleeve 6, for example a profiling in the shape of a wavy profile line, or ribbing. In further alternative realizations, the counter-retaining structure 7b is formed solely by the outer or inner lateral sleeve surface, which is not structured further, on the outer side 6a or the inner side 6b of the extension sleeve 6.

Figure 6:
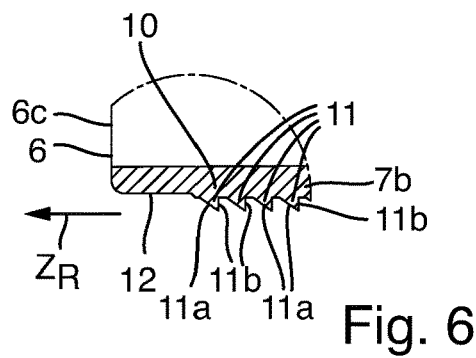
FIG. 6 shows a detail view of a region VI in FIG. 5.

In advantageous embodiments, the retaining tooth structure 10 with the retaining teeth 11 thereof includes a saw tooth profile including flatter tooth trailing edges 11a pointing in the push-back direction ZR of the extension sleeve 6, and opposed thereto steeper tooth front edges 11b, as in the example shown and as can be seen in particular from FIG. 6. This configuration of the retaining tooth structure 10 provides greater resistance in comparison to the push-back force, which is required for pushing back the extension sleeve 6 in the push-back direction ZR, against moving forward, i.e. removing, the extension sleeve 6 in the opposite direction.

This is because, with its flatter tooth trailing edges 11a in comparison to the tooth front edges 11b, the retaining ridge structure 7a, such as the retaining ridge 9, can slide relatively easily onto the retaining tooth structure 10 when the extension sleeve 6 is pushed back from its mounting position MS into its end use position ES, while the retaining teeth 11 with their steeper tooth front edges 11b engage more powerfully in the retaining ridge structure 7b, like the retaining ridge 9, and grip in a blocking manner therein if it is attempted to move the extension sleeve 6 forward axially relative to the sleeve portion 2 of the box housing body 1 out of the end use position ES counter to the push-back direction ZR, i.e. to move same in a direction out of the sleeve portion 2 of the box housing body 1. This tooth configuration consequently results in an asymmetry for moving the extension sleeve 6 into and out from the sleeve portion 2, with a preferred direction of movement axially rearward into the sleeve portion 2. In alternative embodiments, the retaining tooth structure 7b with the retaining teeth 11 thereof can have a different tooth profile, for example a triangular tooth profile which is symmetrical with respect to the axial displacement direction of the sleeve without a preferred direction of movement of the extension sleeve 6 axially rearward.

In advantageous embodiments, the retaining tooth structure 10, as in the exemplary embodiment shown, is disposed with an axial distance to a rearward end face 6c of the extension sleeve 6, and a portion of the extension sleeve 6 extending from the rearward end face 6c axially up to at most to the retaining tooth structure 10 provides a preassembly plug area 12 which is configured for preassembled plugged retaining of the extension sleeve 6 in its mounting position MS on the sleeve portion 2 of the box housing body 1.

Specifically, in the example shown, the preassembly plug area 12 of the extension sleeve 6 cooperates here with the retaining ridge structure 10, such as the retaining ridge 9, as can be seen in particular in FIGS. 1 and 3. Here, the retaining ridge structure 10 is placed on the outside against the preassembly mating area 12, as a result of which the extension sleeve 6 is retained in its mounting position MS on the sleeve portion 2 primarily by means of a frictional engagement. Since the preassembly plug area 12 lies axially behind the retaining tooth structure 10, the retaining tooth structure 10 in the mounting position MS of the extension sleeve 6 is not yet in operative engagement with the retaining ridge structure 7a. This has the result that the extension sleeve 6, when required, can be relatively easily, i.e. with comparatively little need for force, moved forward outwards again from its mounting position MS on the sleeve portion 2, i.e. moved away, or detached from the sleeve portion 2, while the removal of the extension sleeve 6 from its end use position ES preferably requires a significantly higher application of force, or even is no longer possible without damaging the retaining ridge structure 7a.

In corresponding realizations, the extension sleeve 6, as in the example shown, has a radially outwards protruding blind ring flange 13 at its front, free, open end face 6d. This can be used, for example, as a stop surface with which the extension sleeve 6 comes to bear against a finished building wall surface when the extension sleeve 6 is pushed back into its end use position ES.

In corresponding realizations, as in the example shown, an optional mounting cover 17 is attachable on the front end face 6d of the extension sleeve 6, specifically in such a manner that it can easily be detached again from the front end face 6d of the extension sleeve 6. In the example shown, for this purpose, it is especially of pot-shaped configuration and plugged with its pot bottom in front as far as its open pot edge into the extension sleeve 6 on the front end face 6a thereof and can be easily pulled again out of this position. In corresponding embodiments, the mounting cover 17, as in the example shown, includes a preferably central gripping pin 18 and/or a level holder 19 for the preferably clipped or in some other way releasable retaining of a level or circular level which can be used as an alignment aid.

Figure 2:
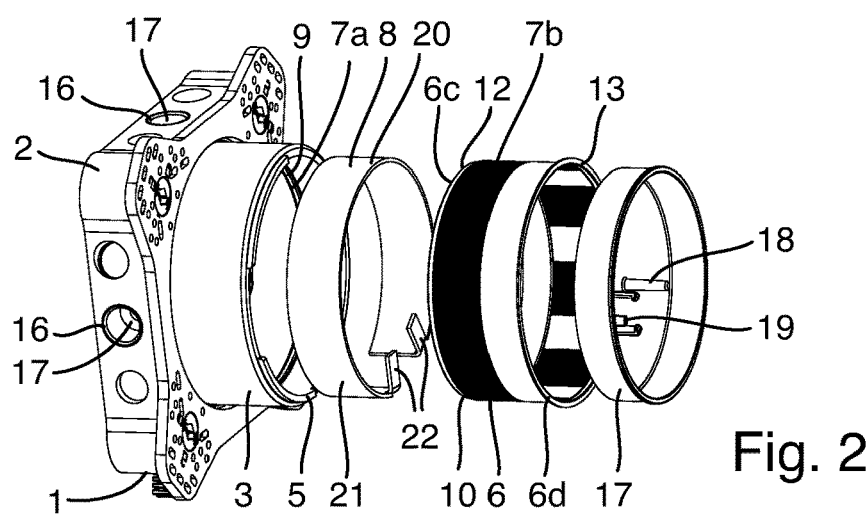
FIG. 2 shows a perspective exploded view of the connection box unit of FIG. 1 with additional, temporarily used components.
Figure 7:
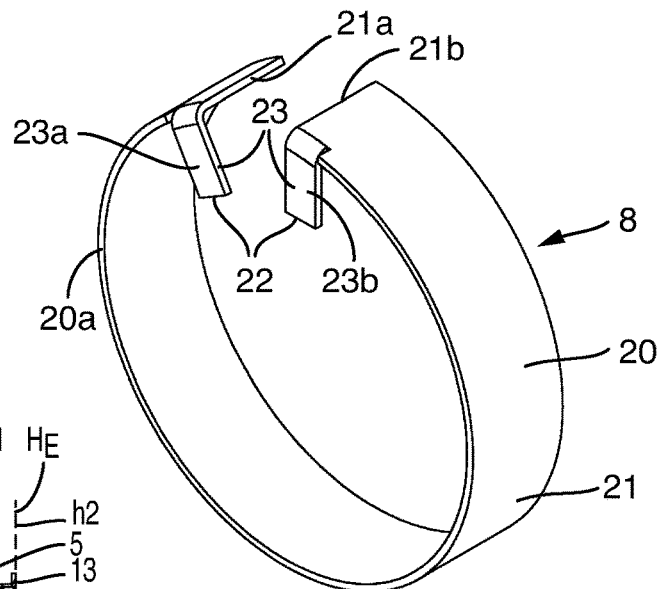
FIG. 7 shows a perspective view of a spacer element for the connection box unit of FIG. 2.

In advantageous embodiments, the spacer element 8, as in the exemplary embodiment shown, includes a spacer sleeve 20 which in the securing position SS is disposed coaxially on the sleeve portion 2 of the box housing body 1 in an axial region behind the extension sleeve 6, as can be seen in particular from FIG. 3, wherein the configuration of the spacer sleeve 20 can be seen in particular from FIGS. 2 and 7.

In advantageous realizations, the spacer sleeve 20, as in the example shown, is a constrictable annular sleeve 21 which is open on its peripheral side and includes a user-operable tightening actuation structure 22. Owing to its open design on its peripheral side, the annular sleeve 21 has two peripheral end regions 21a, 21b opposite each other at a distance in the peripheral direction, as marked in FIG. 7. This realization enables the spacer sleeve 20 to be gripped by the user at the tightening actuation structure 22 and to be constricted, i.e. narrowed in its radial extent, to a certain extent provided by the peripheral distance between the two peripheral end regions 21a, 21b. This facilitates the introduction of the spacer sleeve 20 into the interior of the sleeve portion 2 of the box housing body 1 and at the same time the removal of the spacer sleeve 20 from the sleeve portion 2.

In corresponding realizations, the spacer sleeve 20, as in the example shown, includes a radially inwards overhanging flange structure 23 on a front end face 20a, i.e. pointing in the mounted position counter to the push-back direction ZR of the extension sleeve 6. This can serve as a contact surface against which the extension sleeve 6 comes to bear when the spacer sleeve 20 is in its mounted position in the sleeve portion 2 of the box housing body 1 and the extension sleeve 6 is positioned on the sleeve portion 2 and pushed back as far as its mounting position MS. Alternatively or additionally, the end edge of the front end face 20a of the spacer sleeve 20 acts as such a stop for positioning the extension sleeve 6 in its mounting position MS.

Alternatively or additionally to this stop function, the flange structure 23 can act as the tightening actuation structure 22. For this purpose, in the example shown, the flange structure 23 includes two flange arms 23a, 23b on each one of the two peripheral end regions 21a, 21b that the annular sleeve 21 has because of its open configuration on its peripheral side. When the spacer sleeve 20 is in its mounted position in the sleeve portion 2 of the box housing body 1, the user can easily reach with one hand into the interior of the sleeve portion 2 and grip the two flange arms 23a, 23b with two fingers and move them towards each other in order to somewhat constrict the spacer sleeve 20. The user can subsequently easily remove the spacer sleeve 20 narrowed radially in this manner from the sleeve portion 2 of the box housing body 1. In an analogous manner, the user can conversely easily insert the spacer sleeve 20 into the sleeve portion 2.

Although the invention has been described in detailed with reference to preferred embodiments, variations and modifications exist within the spirit and scope of the invention as described and defined in the following claims.

The invention claimed is:

1. A wall installation connection box unit, comprising:
a box housing body having a rear-side base portion and a sleeve portion projecting forward from the base portion, which sleeve portion peripherally surrounds an installation component mounting space, which space is accessible via an open front end face of the sleeve portion;
an extension sleeve which is configured for coaxial arrangement on the sleeve portion and axial pushing back relative to the sleeve portion; and
a retaining structure which allows axial pushing back of the extension sleeve on the sleeve portion from a mounting position at which the extension sleeve is initially retained on the sleeve portion to an end use position on a variable axial level and retains the extension sleeve in the end use position on the sleeve portion wherein the extension sleeve is moveable from the mounting position to the end use position without rotational movement;
wherein:
the retaining structure includes a retaining ridge structure radially projecting from the sleeve portion, which retaining ridge structure is formed integrally with at least one adjacent axial partial region of the sleeve portion from a sealing resilient material, and a counter-retaining structure cooperating with the retaining ridge structure in at least one of a frictionally engaged manner and a form-locking manner, the counter-retaining structure being provided on the extension sleeve and made of a material which has greater stiffness as compared to the sealing resilient material, or
the wall installation connection box unit comprises a spacer element which is attachable to the box housing body in a securing position in a detachable manner, where the spacer element secures the extension sleeve in the mounting position against axial pushing back.

2. The wall installation connection box unit according to claim 1, wherein the retaining ridge structure includes a continuous circumferential retaining ridge on its peripheral side, which retaining ridge protrudes radially inwards on an inner side of the sleeve portion, or radially outwards on an outer side of the sleeve portion.

3. The wall installation connection box unit according to claim 1, wherein the retaining ridge structure is formed from a synthetic foamed material.

4. The wall installation connection box unit according to claim 3, wherein the retaining ridge structure is formed from a thermoplastic particle foamed material.

5. The wall installation connection box unit according to claim 1, wherein the counter-retaining structure includes a retaining tooth structure having a plurality of axially successive retaining teeth which, extending peripherally, protrude radially outwards on an outer side of the extension sleeve, or radially inwards on an inner side of the extension sleeve.

6. The wall installation connection box unit according to claim 5, wherein the retaining tooth structure with the retaining teeth thereof comprises a saw tooth profile including flatter tooth trailing edges pointing in the push-back direction of the extension sleeve, and opposed thereto steeper tooth front edges.

7. The wall installation connection box unit according to claim 5, wherein the retaining tooth structure is disposed with an axial distance to a rearward end face of the extension sleeve, and a portion of the extension sleeve extending from the rearward end face axially up to at most to the retaining tooth structure provides a pre-assembly mating area which is configured for preassembled plugged retaining of the extension sleeve in its mounting position on the sleeve portion of the box housing body.

8. The wall installation connection box unit according to claim 1, wherein the extension sleeve has a radially outwards protruding blind ring flange at a front end face.

9. The wall installation connection box unit according to claim 1, further comprising a mounting cover which is attachable on a front end face of the extension sleeve in a detachable manner.

10. The wall installation connection box unit according to claim 1, wherein the spacer element includes a spacer sleeve which in the securing position is disposed coaxially on the sleeve portion in an axial region behind the extension sleeve.

11. The wall installation connection box unit according to claim 10, wherein the spacer sleeve is a constrictable annular sleeve which is open on its peripheral side and includes a user-operable tightening actuation structure.

12. The wall installation connection box unit according to claim 10, wherein the spacer sleeve includes a radially inwards overhanging flange structure on a front end face.

* * * * *